United States Patent Office 3,804,772
Patented Apr. 16, 1974

3,804,772
PREPARATION OF SOLUTIONS OF MIXED URANIUM AND PLUTONIUM NITRATES
Edward Sydney Lane, Didcot, and Norman Jackson, Abingdon, England, assignors to United Kingdom Atomic Energy Authority, London, England
No Drawing. Filed Jan. 17, 1972, Ser. No. 218,458
Claims priority, application Great Britain, Jan. 18, 1971, 2,436/71
Int. Cl. C09k 3/00
U.S. Cl. 252—301.1 R          1 Claim

ABSTRACT OF THE DISCLOSURE

A mixed uranium and plutonium solution wherein the nitrate concentration is slightly greater than, equal to or less than that required for U(VI) and Pu(IV) valencies is prepared by mixing a plutonium(IV) nitrate solution containing nitric acid with a diuranate, uranium trioxide or a solution of uranium trioxide in uranyl nitrate. It is thus possible to prepare mixed solutions where the mole ratio of plutonium to uranium and the mole ratio of nitrate to total metal can be varied according to the nitrate concentration desirable for subsequent operations.

BACKGROUND OF THE INVENTION

This invention relates to the preparation of solutions of mixed uranium and plutonium nitrates and provides an improved method of preparing such solutions.

It is well known that for the preparation of uranium and plutonium nitrate solutions for use in gel processes to prepare mixed oxide spheres it is advantageous if the nitrate content is less than that required for U(VI) and Pu(IV) stoichiometry.

Sub-stoichiometric solutions of uranium nitrate are customarily made by (1) Amine or thermal denitration
(2) Addition of uranium trioxide or ammonium diuranate to uranyl nitrate or nitric acid solutions.

Sub-stoichiometric solutions of plutonium nitrate are customarily made by (3) Amine denitration
(4) Peptization of freshly prepared plutonium(IV) hydroxide with nitric acid.

These nitrate-deficient solutions may then be blended to give mixed solutions of the appropriate composition e.g. 80% uranium and 20% plutonium.

SUMMARY OF THE INVENTION

According to the present invention a mixed uranium and plutonium solution wherein the nitrate concentration is slightly greater than, equal to, or less than that required for U(VI) and Pu(IV) valencies is prepared by mixing a plutonium nitrate solution containing nitric acid with a diuranate, uranium peroxide, uranium trioxide or a solution of uranium trioxide in uranyl nitrate.

By "diuranate" is meant the insoluble product formed on mixing a base such as sodium or ammonium hydroxide with a solution of a uranyl salt. The nominal formula is $R_2U_2O_7$ where R is the cation concerned but the exact composition varies with the concentration and nature of the reactants and on the method of isolation.

STARTING SOLUTIONS

Starting solutions that may be used are as follows:

PLUTONIUM

Plutonium nitrate solutions from nuclear reprocessing plants usually contain 200 to 300 g. per liter Pu in 3 to 5 molar nitric acid. This is preferably used as a Pu(IV) solution which may be obtained from the plant solution either by the addition of hydrogen peroxide or by delaying to allow autoradiolysis.

URANIUM

The final product from the uranium stream of nuclear fuel reprocessing plants is frequently uranium trioxide made by thermally denitrating uranyl nitrate solutions, and this provides an excellent source. Ammonium diuranate is also suitable although the composition is frequently variable. The presence of ammonium nitrate, however, in a sub-stoichiometric mixed nitrate solution of the metals does not prevent its use in gel-precipitation processes.

The uranium trioxide dissolves readily in the plutonium(IV) nitrate solutions by stirring the reactants together at room temperature. Heat may be applied to increase the rate of dissolution, but care is then advisable as plutonium valency disproportionation may also be accelerated.

When carrying out the invention to prepare solutions which contain only small quantities of plutonium, e.g. less than 5% Pu, it is preferable to add the plutonium feed solution, which contains free nitric acid, to a nitrate deficient solution of U(VI) nitrate (prepared as described above), so that the mixed metal solution can be maintained anion deficient. By ushing these different methods it is thus possible to prepare mixed solutions where the mole ratio of plutonium to uranium and the mole ratio of nitrate to total metal can be varied to provide for the amount of nitrate deficiency desirable for subsequent operation.

These nitrate deficient solutions of uranium and plutonium are suitable for use as feed solutions in gel-precipitation processes for the manufacture of spheres. Various other uses can also be envisaged for them, e.g. preparation of mixed oxides by thermal denitration, or the co-precipitation of hydroxides, or oxalates etc.

EXAMPLES OF THE INVENTION

The following examples illustrate the invention.

Example 1

10 g. of a plutonium solution containing 201.7 mg. total plutonium per g. of solution was dispensed into a beaker fitted with a stirrer. The valency states of the plutonium were as follows:

| | Percent |
|---|---|
| Pu(IV) | 99.5 |
| Pu(VI) | 0.2 |
| Pu(III) | 0.2 | and the free nitric acid in the solution was such that 1 g. of the solution was equivalent to 3.76 ml. of molar sodium hydroxide solution. 9.8 g. of uranium trioxide was added, followed by 0.5 ml. of 15 molar nitric acid in 10 ml. of water. The mixture was stirred for 4 hours at room temperature. All the uranium trioxide dissolved to give a dark orange-brown solution which was suitable for conversion to $UO_2$—20% $PuO_2$ spheres by gel-precipitation. The nitrate to total metal ratio was 1.67; a solution consisting solely of Pu(IV) nitrate and U(VI) nitrates would have a nitrate to total metal ratio of 2.4.

Example 2

10 g. of the plutonium solution described in Example 1 was treated in the same way with 4.9 g. of uranium trioxide and 10 ml. of water. The resulting solution had a nitrate to total metal ratio of 2.79 and was suitable for the conversion of $UO_2$—33% $PuO_2$ spheres by gel-precipitation. A solution consisting solely of Pu(IV) nitrate and U(VI) nitrates would have a nitrate to total metal ratio of 2.66.

Example 3

14.3 g. of uranium trioxide was dissolved in 100 ml. of 2 molar uranyl nitrate solution. 10 g. of the plutonium solution described in Example 1 was added with stirring. The resulting solution had a nitrate to total metal ratio of 1.82 and was suitable for the preparation of $UO_2$—3.26% $PuO_2$ spheres.

Example 4

10.9 g. of powdered uranium peroxide (U content=67% by weight) was added to 9.4 g. of a plutonium nitrate solution (1 g. soln=183.4 mg. Pu=2.96 ml. 1 M NaOH). The mixture was stirred and the peroxide slowly dissolved with evolution of gas. The final solution, dark green in color had a nitrate to total metal ratio of 1.488 and was suitable for the preparation of $UO_2$—19% $PuO_2$ spheres.

We claim:

1. A method for the preparation of a nitrate-deficient mixed uranium and plutonium nitrate solution in which the nitrate concentration is less than that required for U(VI) and Pu(IV) valencies comprising adding to a plutonium nitrate solution containing nitric acid in less than a stoichiometric amount a material selected from the group consisting of a diuranate, uranium peroxide, uranium trioxide, and a solution of uranium trioxide in uranyl nitrate.

References Cited

UNITED STATES PATENTS

| | | | |
|---|---|---|---|
| 3,287,279 | 11/1966 | Lyon | 252—301.1 S |
| 3,137,742 | 6/1964 | Soloden | 252—301.1 R |

OTHER REFERENCES

Sidgwick: Chemical Elements and Their Compounds, vol. II, 1950, p. 1076.

CARL D. QUARFORTH, Primary Examiner

R. L. TATE, Assistant Examiner

U.S. Cl. X.R.

252—301.1 S